United States Patent
Nishikawa

(10) Patent No.: US 12,009,879 B2
(45) Date of Patent: Jun. 11, 2024

(54) INTERFERENCE DETECTION APPARATUS, INTERFERENCE DETECTION METHOD, AND NON-TRANSITORY COMPUTER-READABLE MEDIUM

(71) Applicant: NEC Corporation, Tokyo (JP)

(72) Inventor: Yoshiaki Nishikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 17/747,047

(22) Filed: May 18, 2022

(65) Prior Publication Data

US 2022/0385383 A1 Dec. 1, 2022

(30) Foreign Application Priority Data

May 28, 2021 (JP) ................................. 2021-089997

(51) Int. Cl.
*H04B 17/345* (2015.01)
*H04B 1/10* (2006.01)
*H04B 17/391* (2015.01)

(52) U.S. Cl.
CPC ......... *H04B 17/345* (2015.01); *H04B 1/1027* (2013.01); *H04B 17/391* (2015.01)

(58) Field of Classification Search
CPC ...... H04B 1/10; H04B 1/1027; H04B 17/309; H04B 17/345; H04B 17/373; H04B 17/391; H04B 17/3913; H04B 2001/1045; H04L 1/20

USPC ........... 375/224, 346; 455/63.1, 67.11, 67.14
See application file for complete search history.

(56) References Cited

U.S. PATENT DOCUMENTS

| 8,626,069 | B2 * | 1/2014 | Chae ..................... | H04B 7/0408 |
| | | | | 375/267 |
| 2009/0012738 | A1 * | 1/2009 | Hart ....................... | H04W 16/20 |
| | | | | 702/127 |
| 2019/0303752 | A1 * | 10/2019 | Mercier ................. | G06N 3/044 |
| 2021/0097417 | A1 * | 4/2021 | Petladwala ............. | G06N 7/01 |

FOREIGN PATENT DOCUMENTS

| CN | 112949387 A | * | 6/2021 |
| WO | 2019/116417 A | | 6/2019 |

\* cited by examiner

*Primary Examiner* — Young T. Tse

(57) ABSTRACT

An example of an object of the present disclosure is to provide an interference detection apparatus, an interference detection method, and a non-transitory computer-readable medium that allow a user to determine a priority of interference to be dealt with in communication. The interference detection apparatus according to an example embodiment includes at least one memory configured to store an instruction, and at least one processor configured to execute the instruction. The processor is further configured to learn a signal state model by using a learning signal in a communication signal, acquire a detection target signal in the communication signal, detect interference in the detection target signal, and calculate a severity of interference in the detection target signal by using the detection target signal, a detection result of the interference, and the learned signal state model.

15 Claims, 10 Drawing Sheets

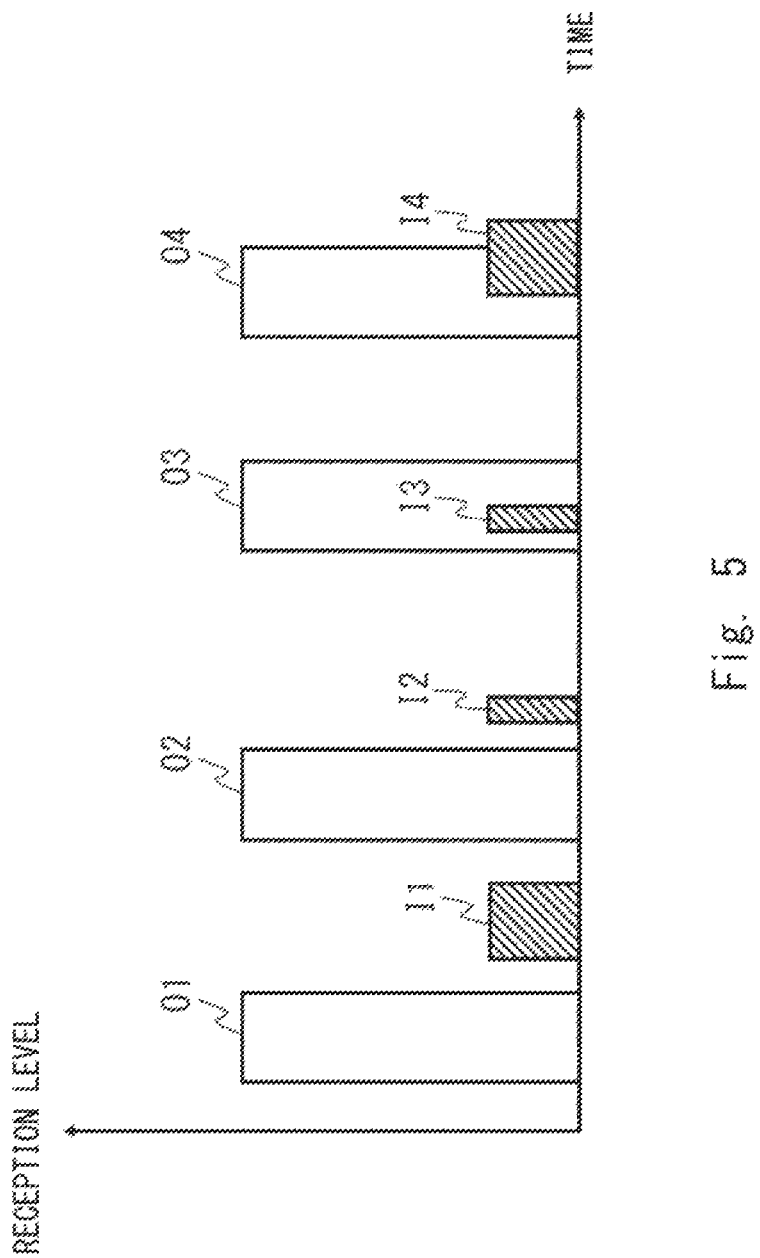

INTERFERENCE DETECTION APPARATUS, INTERFERENCE DETECTION METHOD, AND NON-TRANSITORY COMPUTER-READABLE MEDIUM

INCORPORATION BY REFERENCE

This application is based upon and claims the benefit of priority from Japanese patent application No. 2021-089997, filed on May 28, 2021, the disclosure of which is incorporated herein in its entirety by reference.

TECHNICAL FIELD

The present disclosure relates to an interference detection apparatus, an interference detection method, and a non-transitory computer-readable medium.

BACKGROUND ART

Techniques have been developed for detecting and dealing with deterioration in communication quality due to interference or the like in communication. For example, International Patent Publication No. WO2019/116417 (Patent Literature 1) describes a communication quality deterioration prediction system that predicts a future amount of deterioration in communication quality or whether deterioration in communication quality occurs, within or outside a communication section, by using a learning model relating to deterioration in communication quality in a certain communication section and deterioration in communication quality outside the communication section.

Some types of interference in communication affect a signal, while the other types have little effect. When a detection apparatus detects both types of interference as interference in communication, a user deals with both types of interference, and therefore, there is a problem that dealing with the interference affecting the signal is delayed or a time taken to deal with the interference is increased.

SUMMARY

In view of the above-mentioned problems, an example of an object of the present disclosure is to provide an interference detection apparatus, an interference detection method, and a non-transitory computer-readable medium that enable a user to determine a priority of interference to be dealt with in communication.

An interference detection apparatus according to an aspect of the present example embodiment includes at least one memory configured to store an instruction, and at least one processor configured to execute the instruction. The processor is further configured to learn a signal state model by using a learning signal in a communication signal, acquire a detection target signal in the communication signal, detect interference in the detection target signal, and calculate a severity of interference in the detection target signal by using the detection target signal, a detection result of the interference, and the learned signal state model.

An interference detection method according to an aspect of the present example embodiment includes: learning a signal state model by using a learning signal in a communication signal; acquiring a detection target signal in the communication signal; detecting interference in the detection target signal; and calculating a severity of interference in the detection target signal by using the detection target signal, a detection result of the interference, and the learned signal state model.

A non-transitory computer-readable medium according to an aspect of the present example embodiment stores a program causing a computer to execute: learning a signal state model by using a learning signal in a communication signal; acquiring a detection target signal in the communication signal; detecting interference in the detection target signal; and calculating a severity of interference in the detection target signal by using the detection target signal, a detection result of the interference, and the learned signal state model.

BRIEF DESCRIPTION OF DRAWINGS

The above and other aspects, features and advantages of the present disclosure will become more apparent from the following description of certain exemplary embodiments when taken in conjunction with the accompanying drawings, in which:

FIG. 5 is a graph illustrating an example of a seriousness of interference according to the second example embodiment;

EMBODIMENTS

First Embodiment

A first example embodiment according to the present disclosure will be described below with reference to the drawings.

Figure 1:
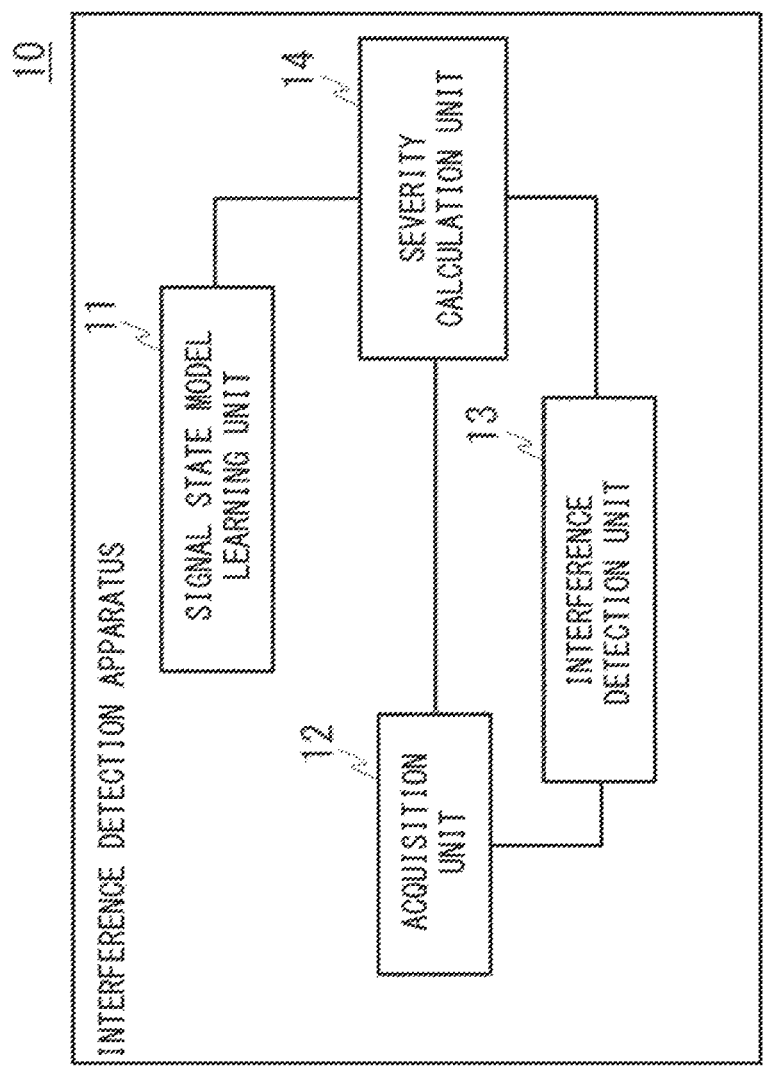
FIG. 1 is a block diagram illustrating an example of an interference detection apparatus according to a first example embodiment.

FIG. 1 is a block diagram illustrating an example of an interference detection apparatus. An interference detection device 10 is provided on a receiving side in wireless communication or wired communication, and detects interference in a signal (communication signal) related to communication. The interference detection apparatus 10 of FIG. 1 includes a signal state model learning unit 11, an acquisition unit 12, an interference detection unit 13, and a severity calculation unit 14. Each unit (each means) of the interference detection apparatus 10 is controlled by a control unit (controller) (not illustrated). Hereinafter, each unit will be described.

The signal state model learning unit 11 learns a signal state model by using a learning signal in a communication signal. The communication signal is a signal that can take a plurality of signal states, and for example, in the case of a digital signal, the communication signal has a binary state of 1 (ON state) or 0 (OFF state), but may be a signal having a state of three or more values. The learning signal is a signal used for learning for determining a signal state in a detection target signal, which will be described later, among communication signals. The learning signal may be acquired by the interference detection apparatus 10 from the acquisition unit 12, which will be described later, or may be stored in advance by the interference detection apparatus 10.

The signal state model is a state transition model in which, for a plurality of states that a learning signal can take, when a signal is in a certain state in a certain time slot (a time zone that becomes one unit of a signal), a transition probability that, in an adjacent time slot, a signal transitions to another state different from the state is defined. For example, when the signal can take binary states of a first state and a second state, the signal state model defines a transition probability that transitions from the first state to the second state, a transition probability that transitions from the second state to the first state, and a transition probability that each state continues. In addition, when a signal can take states of three values A, B, and C, the signal state model defines a transition probability that transitions from A to B, a transition probability that transitions from B to A, a transition probability that transitions from A to C, a transition probability that transitions from C to A, a transition probability that transitions from B to C, a transition probability that transitions from C to B, and a transition probability that each state continues.

The acquisition unit 12 is an interface for acquiring a detection target signal in a communication signal, and outputs the acquired detection target signal to the interference detection unit 13 and the severity calculation unit 14. The plurality of signal states that the detection target signal can take are common to the plurality of signal states that the learning signal can take. The detection target signal may be a signal of frequency bands that are the same as or adjacent to the learning signal. For example, the detection target signal and the learning signal may be radio signals received by the same device or adjacent devices, and the detection target signal may be a signal received by the interference detection device 10 in a period different from the learning signal. Alternatively, a part of a transmission path of the detection target signal from a transmission source to the interference detection apparatus 10 may be a wired or wireless path common to or adjacent to a part of the transmission path of the learning signal from the transmission source to the interference detection apparatus 10. For example, the learning signal and the detection target signal may be transmitted to the interference detection apparatus 10 via a common local area network (LAN) cable connected to the interference detection apparatus 10. Herein, "adjacent" indicates a condition under which the same interference occurs between the detection target signal and the learning signal. For example, when the detection target signal is a signal in a frequency band adjacent to the learning signal, it means that the learning signal can be received in a bandwidth capable of receiving the detection target signal.

The interference detection unit 13 detects interference in the detection target signal. An interference detection target period of the signal is, for example, a period that does not overlap with a learning period, and the interference detection unit 13 can detect in which time slot of the detection target signal the interference exists.

The severity calculation unit 14 calculates a severity of interference in the detection target signal by using the detection target signal, an interference detection result of the interference detection unit 13, and the learned signal state model. More specifically, the severity calculation unit 14 applies the learned signal state model to data of the signal state in at least one of periods (one time slot or a plurality of time slots) before or after a time series in one time slot or a plurality of time slots in which the interference has occurred in the detection target signal. As a result, the severity calculation unit 14 determines a severity to be higher as the probability that the signal state in the time slot in which the interference has occurred is turned ON is higher or as the period in which the interference has occurred is longer. When there is a high probability that the signal state in the time slot in which the interference has occurred is ON, it is considered that the interference is likely to have an influence on the signal because the interference is likely to overlap with the ON state of the signal. When the period in which the interference has occurred is long, it is considered that there is a high possibility that the interference overlaps with the ON state of the signal, or the period in which the interference overlaps with the ON state of the signal is long. Again, it is considered that the interference is likely to affect the signal.

Figure 2:
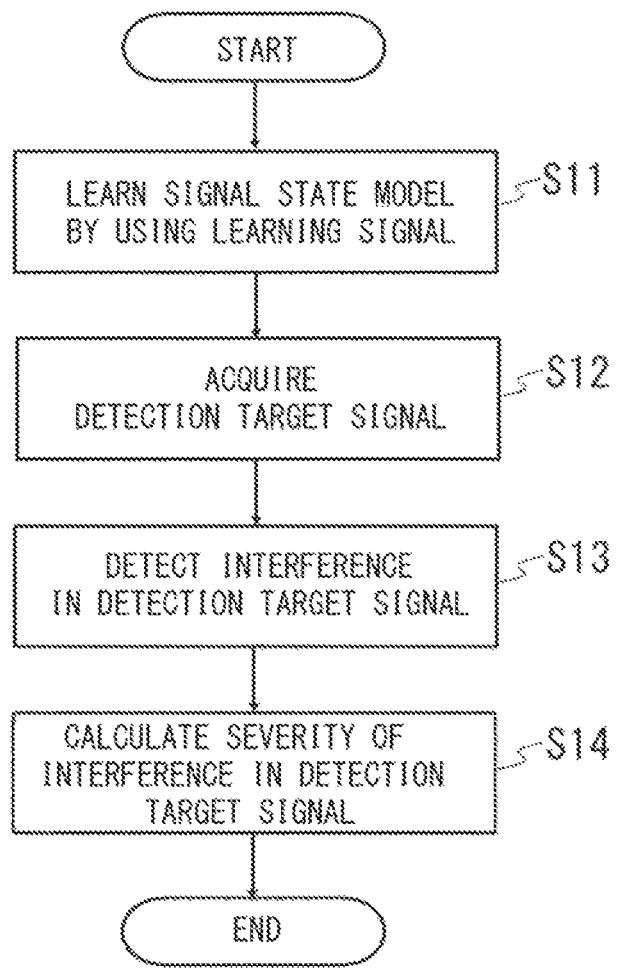
FIG. 2 is a flowchart illustrating an example of processing of the interference detection apparatus according to the first example embodiment.

FIG. 2 is a flowchart illustrating an example of representative processing of the interference detection apparatus 10, and the processing of the interference detection apparatus 10 will be described by this flowchart. First, the acquisition unit 12 of the interference detection apparatus 10 learns a signal state model by using a learning signal (step S11; a signal state model learning step).

Next, the acquisition unit 12 acquires a detection target signal (step S12; an acquisition step). The interference detection unit 13 detects interference in the detection target signal (step S13; an interference detection step). The severity calculation unit 14 calculates a severity of interference in the detection target signal by using the detection target signal, an interference detection result of the interference detection unit 13, and the learned signal state model (step S14; a severity calculation step). The interference detection apparatus 10 can notify a user of the calculated severity by a display unit, an audio output unit, or the like.

As described above, the interference detection apparatus 10 can calculate the severity of the interference in the detection target signal by using the signal state model. Therefore, the user can immediately understand whether the interference is severe or not, based on the calculated severity, and thus the user can determine a priority of the interference to be dealt with in communication.

Second Embodiment

Hereinafter, a second example embodiment according to the present disclosure will be described with reference to the drawings. The second example embodiment discloses a specific example of the interference detection apparatus 10 described in the first example embodiment.

Figure 3:
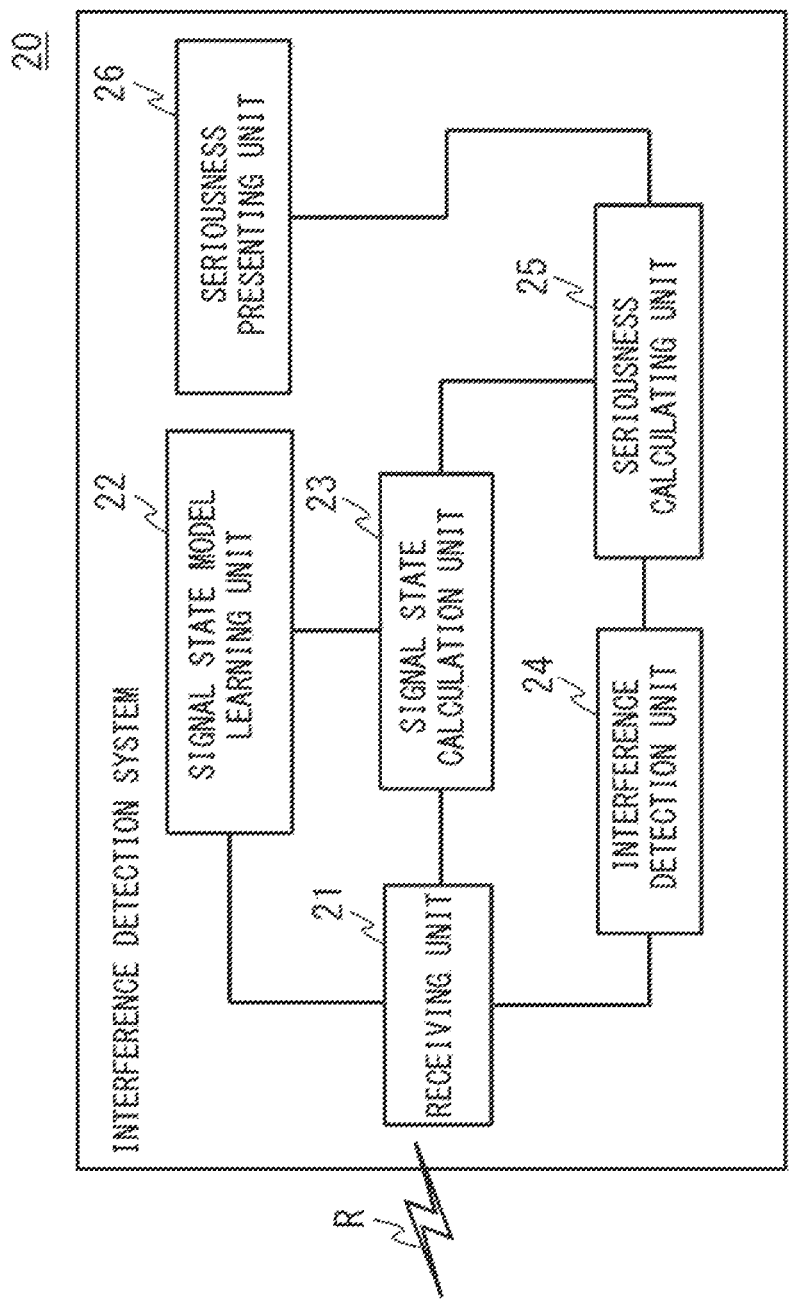
FIG. 3 is a block diagram illustrating an example of an interference detection system according to a second example embodiment.

FIG. 3 is a block diagram illustrating an example of an interference detection system 20. The interference detection system 20 is a device constituting an interference detection system of a radio signal, and includes a receiving unit 21, a signal state model learning unit 22, a signal state calculation unit 23, an interference detection unit 24, a seriousness calculating unit 25, and a seriousness presenting unit 26. Details of each part will be described below.

The receiving unit 21 is an interface that receives a radio signal R (communication signal in the first example embodiment) from a transmitting apparatus (not illustrated). The radio signal R is transmitted in a predetermined frequency band, and is a signal having binary values in an ON state or an OFF state. The receiving unit 21 outputs signal information of the acquired radio signal R (learning signal) in a learning period to the signal state model learning unit 22, and outputs the signal information of the acquired radio signal R (detection target signal) in a detection period to the signal state calculation unit 23 and the interference detection unit 24. The learning period is a period in which a time series is earlier than the detection period. As described above, the learning signal and the detection target signal each include signal information of different radio signals R. In the learning signal, the ON state and OFF state of the signal are analyzed by the signal state model learning unit 22 and become known. On the other hand, in the detection target signal, the ON state and OFF state of the signal are derived by the calculation of the signal state calculation unit 23.

The signal state model learning unit 22 uses the acquired learning signal and learns the signal state model, based on the predefined signal state model. Herein, the signal state model is a model used for calculating whether a value of a signal to be calculated in each time slot is an ON state or an OFF state. The signal state model has a transition probability determined by the signal state, transition, and learning, which are predefined by the signal state model learning unit 22. The signal state model learning unit 22 learns the transition probability by using information regarding the signal state in the learning signal.

The above-mentioned signal to be calculated is a signal on an interference receiving side in the interference detection system, such as voice in the case of voice communication, data in the case of data communication, or management information in the case of communication for management. The signal state model learning unit 22 can determine whether or not an ON state signal (ON signal) is included by demodulating the received signal or detecting that the signal is received at an intensity equal to or higher than a certain reception level in a certain frequency band, but the signal may be determined by other methods. In this manner, the signal state model learning unit 22 learns the signal state model before the detection target signal is transmitted. The learned signal state model is output to the signal state calculation unit 23. The learned signal state model may be stored in a storage unit (not illustrated).

Figure 4:
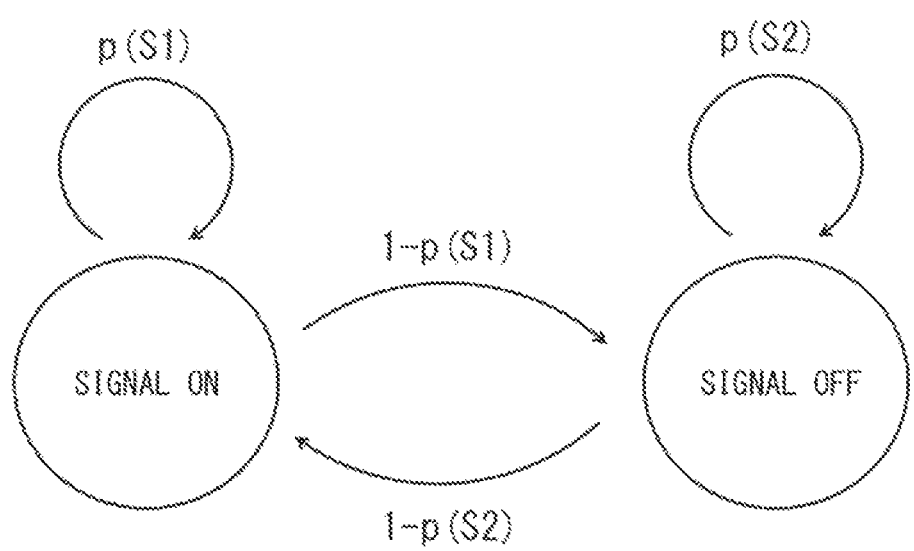
FIG. 4 is a state transition diagram illustrating an example of a signal state model according to the second example embodiment.

FIG. 4 is a state transition diagram illustrating an example of a signal state model generated by the signal state model learning unit 22. In the signal state model in FIG. 4, an ON state (S1) and an OFF state (S2) of the signal, a transition probability that each state continues, and a transition probability that each state transitions to a different state are set. In FIG. 4, when the signal is ON in a time slot to be analyzed, the probability that the signal is ON (the probability that the state continues) is set to p (S1), and the probability that the signal is OFF (the probability that the state transitions) is set to 1-p (S1) at the time of the next time slot in time series. On the other hand, when the signal is OFF in a certain time slot, the probability that the signal is OFF is set to p (S2), and the probability that the signal is ON is set to 1-p (S2) at the time of the next time slot in time series. The signal state model learning unit 22 determines these four transition probabilities by learning.

Note that the signal state model learning unit 22 may define only a state of the transition source as a parameter that determines each transition probability, or may further define other parameters. Other parameters include, for example, a length of time that the current signal state continues (the number of time slots) and the number of transitions. The signal state model learning unit 22 determines each transition probability by setting such parameters by learning. The state of the signal state model, the number of possible states, and the method of transition are not limited to those illustrated in FIG. 4.

Returning to FIG. 3, the description will be continued. The signal state calculation unit 23 calculates the signal state of the detection target signal by using the learned signal state model generated by the signal state model learning unit 22 and the signal information of the detection target signal being output from the receiving unit 21. For example, in the signal state model illustrated in FIG. 4, since the signal state is the ON signal or the OFF signal, whether the signal state of a certain time slot is the ON signal or the OFF signal is derived by calculation, by using the signal state model, in the signal information during the period in which there is no interference. Then, the derived signal state is output to the seriousness calculating unit 25.

The interference detection unit 24 performs interference determination by using the received signal information. Since any existing technique can be used for this interference determination, a detailed description thereof will be omitted. As an example of an existing technique, a technique of a frequency mask for interference determination or a technique of performing classification or identification by some learning may be used. As a method of generating this frequency mask, an algorithm of machine learning, for example, One-Class SVM (Support Vector Machine) which is a method of outlier detection can be used. Explanation of the One-Class SVM is omitted because it is a general content. The interference detection unit 24 performs interference determination over the entire time-series of the signal, and outputs a result of determining whether interference exists in each period or time slot of the signal to the seriousness calculating unit 25.

The seriousness calculating unit 25 calculates a seriousness (severity) of interference in the detection target signal by using the signal state calculated by the signal state calculation unit 23 and the interference detection result detected by the interference detection unit 24. Herein, the seriousness is a factor in consideration of the influence on wireless communication, which means whether the ON signal and the interference overlap and a degree of the overlap. In other words, the greater the number of ON signals during the period in which the interference occurs or the longer the interference occurs, the greater the seriousness of the interference. Hereinafter, a calculation method of the severity will be further described.

FIG. 5 is a graph illustrating an example of the seriousness of interference. In FIG. 5, ON signals O1 to O4 and interferences I1 to I4 are illustrated. The interferences I1 and I2 do not overlap with an ON signal O, and therefore are not serious interferences. On the other hand, since the interferences I3 and I4 overlap with ON signals O3 and O4, respectively, they are serious interferences. In addition, since a time length of the interference I4 in the ON signal O4 is longer than a time length of the interference I3 in the ON signal O3, the interference I4 is interference having a higher seriousness than the interference I3.

Since a user of the wireless communication on the interference side does not generate interference on purpose, it is generally impossible to know characteristics of the signal causing interference in advance. In other words, a degree of overlap between the ON signal and the interference illustrated in FIG. 5 cannot be known. Therefore, in the period in which interference occurs in the signal information, the seriousness calculating unit 25 needs to estimate the signal state by using the learned signal state model.

(i) For example, the seriousness calculating unit 25 can calculate the probability of the ON state in the period determined to have interference by using the transition probability defined in the learned signal state model and the signal state of the time slot immediately before the period determined to have interference. When it is determined that there is interference in one time slot (i.e., one time period of state transition determination), the probability P of the ON state in the period with interference is as follows in the model illustrated in FIG. 4:

(1) When it is in the OFF state in the time slot immediately before the period with interference, $P=1-p(S2)$; and (2) When it is in the ON state in the time slot immediately before the period with interference, $P=p(S1)$.

The seriousness calculating unit 25 calculates the seriousness, based on the probability P. However, by using the transition probability defined in the learned signal state model and the signal state of the time slot immediately after the period determined to have interference, the seriousness calculating unit 25 can also calculate the probability P of the ON state in the period determined to have interference.

(ii) As another example, in the case where the period determined to have interference is a time length over a plurality of time slots, the seriousness calculating unit 25 may estimate a state transition path during the period with interference by using the learned signal state model and the signal state for a fixed period before and after the period determined to have interference. In this case, the seriousness calculating unit 25 can calculate the number of time slots (time length) in the ON state, the number of times the signal is continuously in the ON state, or the like as the seriousness, based on the state transition in the estimation result. In addition, the seriousness calculating unit 25 may calculate the seriousness by summing the seriousness of a plurality of state transition paths with high transition probabilities. Calculations based on the above examples illustrated in (i) and (ii) are illustrated as calculation examples to be described later.

Returning to FIG. 3, the description will be continued. The seriousness presenting unit 26 is an interface for presenting the seriousness calculated by the seriousness calculating unit 25 to the user of the interference detection system 20. For example, the seriousness presenting unit 26 includes a display unit and an audio output unit.

FIGS. 6A to 6D are flowcharts each illustrating an example of representative processing of the interference detection system 20, which describes a series of processing of the interference detection system 20. Details of the processing executed by each unit are as described above, and therefore will be omitted as appropriate.

Figure 6A:
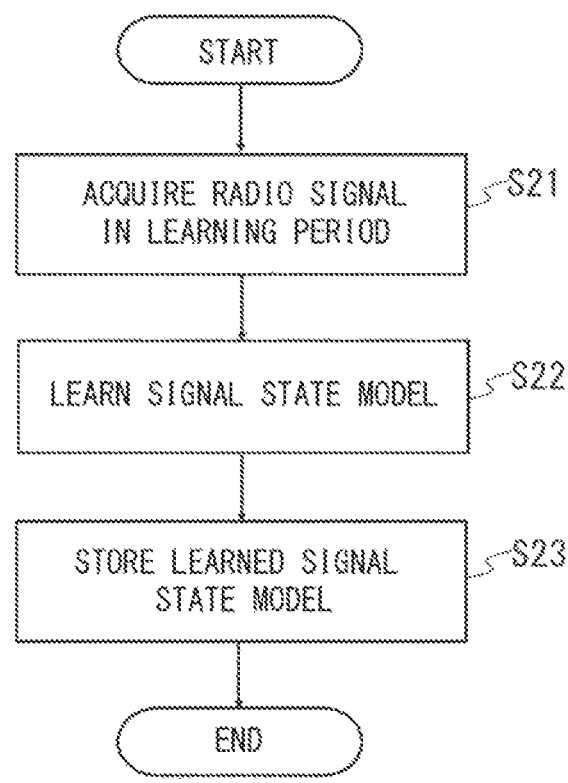
FIG. 6A is a flowchart illustrating an example of processing of learning a signal state model of the interference detection apparatus according to the second example embodiment.

First, processing of learning the signal state model of the interference detection system 20 illustrated in FIG. 6A will be described. The receiving unit 21 receives the radio signal R in the learning period, thereby acquiring signal information of the learning signal (step S21). Next, the signal state model learning unit 22 learns the signal state model by using the signal information acquired in step S21 (step S22). The signal state model learning unit 22 stores the learned signal state model in a storage unit (not illustrated) of the interference detection system 20 (step S23).

Figure 6B:
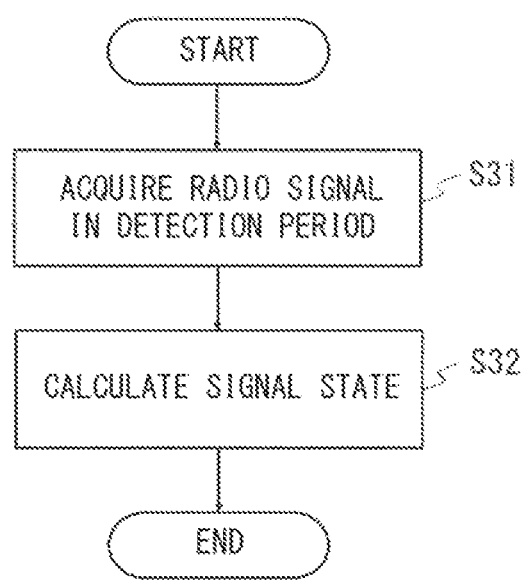
FIG. 6B is a flowchart illustrating an example of processing of determining whether interference exists according to the second example embodiment.

Next, processing of learning the signal state of the detection target signal of the interference detection system 20 illustrated in FIG. 6B will be described. The receiving unit 21 receives the radio signal R in the detection period, thereby acquiring signal information of the detection target signal (step S31). The signal state calculation unit 23 calculates the signal state for each time slot of the detection target signal by using the signal information acquired in step S31 and the signal state model already learned in step S22 (step S32). The signal state calculation unit 23 outputs the calculated signal state to the seriousness calculating unit 25. The signal state calculation unit 23 may store the signal state in a storage unit (not illustrated) of the interference detection system 20.

Figure 6C:
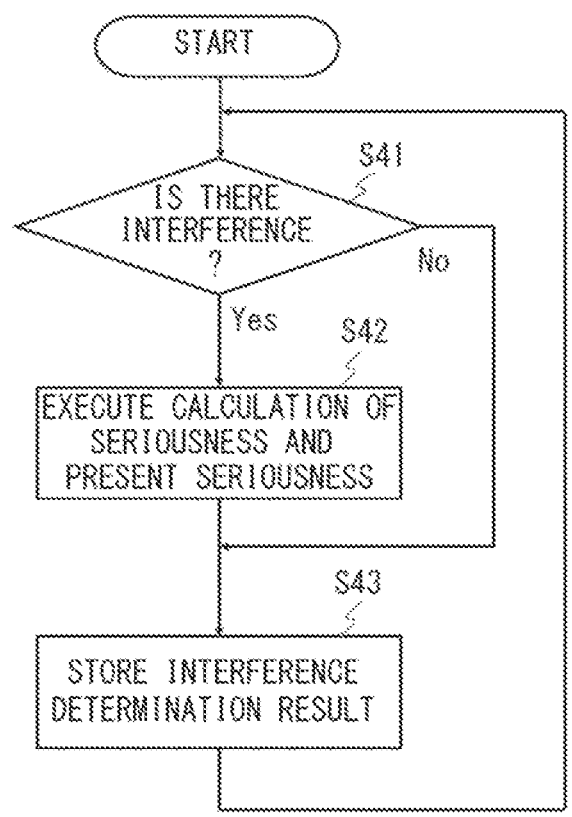
FIG. 6C is a flowchart illustrating an example of processing of calculating the seriousness according to the second example embodiment.

Next, processing of determining whether interference exists in the interference detection system 20 illustrated in FIG. 6C will be described. The interference detection unit 24 determines whether interference exists or not for each time slot of the detection target signal (step S41). The interference detection unit 24 outputs, to the seriousness calculating unit 25, time information of the time slot and the information indicating whether interference exists in the time slot as the interference detection result.

When interference exists in the time slot to be detected (Yes in step S41), the seriousness calculating unit 25 calculates the seriousness of interference in the period in which interference exists, by using the signal state in the time slot calculated in step S32 and the interference detection result detected by the interference detection unit 24. Details of this will be described later. The seriousness presenting unit 26 presents the seriousness (step S42).

Then, the interference detection unit 24 stores the interference determination result of step S41 in a storage unit (not illustrated) of the interference detection system 20 (step S43). In the processes of steps 42 and 43, either process may be executed first or both processes may be executed in parallel. Even when no interference exists in the time slot to be detected (No in step S41), the interference detection unit 24 executes the processing of step S43 of storing the interference determination result in the storage unit.

Figure 6D:
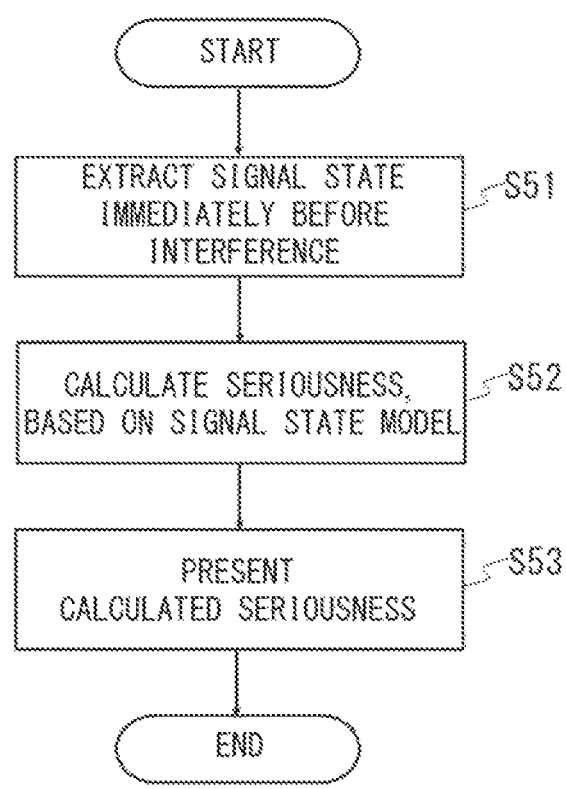
FIG. 6D is a flowchart illustrating an example of processing of calculating the seriousness according to the second example embodiment.

Finally, a detailed example of the processing of step S42 illustrated in FIG. 6D will be described. First, the seriousness calculating unit 25 extracts the signal state immediately before the period determined to have interference (step S51). Next, the seriousness calculating unit 25 determines a transition probability of transition from the signal state extracted in step S51 to the ON state in the learned signal state model, and calculates the seriousness by using the transition probability (step S52). The seriousness presenting unit 26 presents the seriousness calculated in step S52 to the user (step S53).

As described above, based on the learned signal state model, the interference detection system 20 can calculate and present the seriousness of the interference in the detection target signal by using the probability that the signal is turned on during the period in which the interference exists. Therefore, similarly to the first example embodiment, the user can determine the priority of interference to be dealt with in communication.

Wireless communication using radio waves is utilized in various fields, and there are various techniques for determining whether interference exists in the communication and coping with the interference. Among communications, communications such as police radio and railway radio, which are particularly important, are called important radio communications. When interference occurs in important wireless communications, it is very important to detect (monitor) abnormality in a state of emission of radio waves used for these communications, because it may lead to a life-threatening situation.

As one type of unsupervised learning for performing interference detection on an unknown received signal, there is a method of learning a known signal in a state in which interference is not received, and performing interference detection by using factors such as a distance and similarity between the unknown signal and the learned known signal. Herein, the factors such as a distance and similarity do not reflect the influence of interference on actually used wireless communication. Therefore, when the interference detection system automatically performs interference detection by using such a method, the interference detection system detects a large amount of interference including those that do not affect wireless communication and those with little influence to a negligible extent. As a result, the user of the interference detection system does not know which interference is to be preferentially dealt with, such as cause analysis and resolution, in the detected large amount of interference.

In contrast, the interference detection system 20 can present the user with a seriousness that reflects the effect of the detected interference on the signal that is turned on (a degree of substantial quality degradation). Therefore, the user can preferentially determine the interference to be dealt with, such as cause analysis and solution. Therefore, it is possible to efficiently deal with interference in wireless communication.

CALCULATION EXAMPLE

Next, implementation of the interference detection system 20 will be described by using a specific calculation example. In the following example, a case will be described in which the interference detection system 20 receives a radio wave in a frequency band of 400 MHz as a radio signal R affected by interference. Herein, the frequency band of 400 MHz means that a frequency width of 1 MHz is used for radio wave transmission centering on 400 MHz.

First, the user sets the frequency band of the receiving unit 21 of the interference detection system 20 as described above. Thereafter, the receiving unit 21 receives a radio wave of 400 MHz±0.5 MHz as the radio signal R for about 100 seconds, which is the learning period. The signal state model learning unit 22 acquires time-series data of an IQ signal with respect to the received learning signal. Herein, when the communication is in the ON state, the reception level is high, and when the communication is in the OFF state, the reception level is low. Therefore, the signal state model learning unit 22 converts time-series data of the amplitude in the acquired time-series data into state time-series data in which the ON state is set when the absolute value of the amplitude exceeds a certain threshold value and the OFF state is set when the absolute value of the amplitude does not exceed the threshold value. The threshold value for determining the ON state and the OFF state is stored in the storage unit of the interference detection system 20, and the signal state model learning unit 22 uses the threshold value in learning. In this example, it is assumed that 101 samples (one sample: one time slot to be analyzed) of the state time-series data can be acquired.

Calculation Example 1

First, an example in which the signal state model learning unit 22 calculates the signal state model illustrated in FIG. 4 will be illustrated. Herein, it is assumed that the number of transitions starting in the ON state is 20 and the number of transitions continuing in the ON state is 18 in the time-series data in the learning signal. At this time, $$p(S1)=18/20=0.9 \qquad (1).$$

Assuming that the number of transitions starting in the OFF state is 80 and the number of transitions continuing in the OFF state is 78, $$p(S2)=78/80=0.975 \qquad (2).$$

The signal state model learning unit 22 learns the signal state model by calculating p(S1) and p(S2) in this manner.

Next, the receiving unit 21 of the interference detection system 20 receives a radio wave in a state in which the same frequency band as the learning signal is set, thereby acquiring time-series data of an IQ signal which is a detection target signal. Similar to the learning signal, the signal state calculation unit 23 converts the time-series data into state time-series data in which the ON state and the OFF state are set.

In addition, the interference detection unit 24 performs interference determination of the detection target signal by using the time-series data of the IQ signal acquired by the receiving unit 21. Herein, it is assumed that the interference detection unit 24 determines that there is interference in a time zone of the 50th sample in the state time-series data of the detection target signal.

The seriousness calculating unit 25 calculates the seriousness of the 50th sample interference as follows. When a state of the 49th sample of the state time-series data of the detection target signal is the ON state (S1), referring to the learned signal state model, the probability p(S1) that S1 continues is 0.9 as illustrated in (1). Therefore, the seriousness calculating unit 25 calculates the seriousness of the interference as 0.9.

Calculation Example 2

In this calculation example 2, it is assumed that the interference detection unit 24 determines that interference exists in successive time zones of the 50th sample and the 51st sample of the state time-series data in the detection target signal. Herein, the learned signal state model is as illustrated in calculation example 1. Since the probability p(S1) that the signal is in the ON state (S1) is 0.9, the seriousness calculating unit 25 calculates the seriousness of the 50th sample of interference as 0.9 in the similar manner to the calculation example 1. Furthermore, the interference detection unit 24 determines that a probability p1 that the detection target signal is in the ON state (S1) at the 50th sample and the signal continues to be in the ON state at the 51st sample is $$p1=0.9\times0.9 \qquad (3).$$

Further, it is determined that a probability p2 that the detection target signal is in the OFF state (S2) at the 50th sample and the signal transitions to the ON state at the 51st sample is $$p2=0.1\times0.025 \qquad (4).$$

From the above, the interference detection unit 24 calculates the seriousness of the 51st sample of interference as 0.8125 by taking the sum of (3) and (4).

Calculation Example 3

In this calculation example 3, the seriousness calculating unit 25 calculates p1 and p2 as illustrated in (3) and (4) by performing the similar calculation to the calculation example 2. Then, the seriousness calculating unit 25 calculates the overall seriousness of interference between the 50th sample and the 51st sample (i.e., the seriousness in the detection target signal) as 0.9+0.8125=1.7125, which is the total sum of seriousness in both samples.

However, the seriousness calculating unit 25 may calculate an average value of seriousness in both samples as the seriousness in the detection target signal. In addition, the seriousness presenting unit 26 may present a duration length of the interference determined to "have interference" by the interference detection unit 24 together with the seriousness calculated by the seriousness calculating unit 25. The duration length may be defined, for example, as the number of samples. In this case, since it is determined that there is interference between the 50th sample and the 51st sample, the duration length is 2.

Calculation Example 4

In this calculation example 4, as a parameter for determining the transition probability of the signal state model, a time length L in which the signal state of a target sample has continued in the past is further defined. In this example, the time length L is the number of consecutive samples in a certain state on the state time-series data of the detection target signal. For example, when the signal state of the target sample is the ON state and the signal state immediately before it is the OFF state, L becomes 1. On the other hand, when the signal state of the target sample is the OFF state, the signal state of the first preceding one is the OFF state, and the signal state of the second preceding one is the ON state, L becomes 2.

Further, it is assumed that the probability that the ON state continues in the next sample when the ON state (S1) continues for the time length L is p(S1, L), and the probability that the OFF state continues in the next sample when the OFF state (S2) continues for the time length L is p(S2, L). The signal state model learning unit 22 learns a signal state model using the time length L as a parameter. In this learned signal state model, it is assumed that p(S1, 1) and p(S1, 4) are as follows:

$$p(S1,1)=1.0 \quad (5); \text{ and}$$

$$p(S1,4)=0.0 \quad (6).$$

Herein, similarly to the calculation example 1, it is assumed that interference is detected in the time zone of the 50th sample of the state time-series data of the detection target signal, the state of the 49th sample is the ON state (S1), and L=1 in the 49th sample. By referring to the learned signal state model, the seriousness calculating unit 25 determines that the probability p(S1, 1) that the ON state continues is 1.0, as illustrated in (5). Thus, the seriousness of the interference of the 50th sample is calculated to be 1.0.

Further, it is assumed that interference is detected in a time zone of a 65th sample of the state time-series data of the detection target signal, a state of a 64th sample is the ON state (S1), and L=4 in the 64th sample. By referring to the learned signal state model, the seriousness calculating unit 25 determines that the probability p(S1, 4) that the ON state continues is 0.0, as illustrated in (6). Thus, the seriousness of the interference of the 64th sample is calculated to be 0.0.

As described above, when it is considered that the ON state continues until the period determined to have interference, the seriousness becomes 1, which is the maximum value. In this case, the user can recognize that the interference is to be dealt with preferentially. On the other hand, when it is not considered that the ON state continues until the period determined to have interference, the seriousness is 0. In this case, the user can recognize that the priority for coping with the interference is low or that there is no need to deal with the interference.

Calculation Example 5

In this calculation example 5, similarly to the calculation example 4, the signal state model learning unit 22 defines the time length L as a parameter and learns a communication state model. Then, similarly to the calculation example 2, it is assumed that interference is detected in the time zones of the 50th sample and the 51st sample of the state time-series data of the detection target signal, and the signal state of the 49th sample is the ON state (S1). Further, it is assumed here that the signal state of the 52nd sample is the ON state (S1).

At this time, the seriousness calculating unit 25 determines that four types of state transition paths can be taken for the 50th sample and the 51st sample by referring to the communication state model. The four types of paths are a path 1 [S1, S1, S1, S1], a path 2 [S1, S1, S2, S1], a path 3 [S1, S2, S1, S1], and a path 4 [S1, S2, S2, S1]. Note that [R1, R2, R3, R4] in each path is the signal state of the 49th sample for R1, the signal state of the 50th sample for R2, the signal state of the 51st sample for R3, and the signal state of the 54th sample for R4.

In this calculation example 5, it is assumed that the transition probabilities p(S1, 1), p(S1, 2), p(S1, 3), p(S2, 1), and p(S2, 2) related to the calculation defined in the communication state model are respectively $$p(S1,1)=0.9 \quad (7),$$

$$p(S1,2)=0.9 \quad (8),$$

$$p(S1,3)=0.7 \quad (9),$$

$$p(S2,1)=1.0 \quad (10), \text{ and}$$

$$p(S2,2)=0.9 \quad (11).$$

Herein, the seriousness calculating unit 25 calculates the transition probability in each of the paths 1 to 4 as follows by using (7) to (11):

$$(\text{Path } 1) 0.9 \times 0.9 \times 0.7 = 0.567 \quad (12);$$

$$(\text{Path } 2) 0.9 \times 0.1 \times 0.0 = 0.0 \quad (13);$$

$$(\text{Path } 3) 0.1 \times 0.0 \times 0.9 = 0.0 \quad (14); \text{ and}$$

$$(\text{Path } 4) 0.1 \times 1.0 \times 0.1 = 0.01 \quad (15).$$

Based on the calculations of (12) to (15), the seriousness calculating unit 25 determines that the path 1 has the highest transition probability. As a result, the seriousness calculating unit 25 estimates that the transition path of the signal state during the periods of the 50th sample and the 51st sample in which the interference is detected is the path 1. The seriousness calculating 25 determines that two samples of the ON state (S1) are included during the period in which interference exists in the path 1, thereby calculating the overall seriousness of this period as 2 indicating that two samples of the ON state period are included. Note that the seriousness calculating unit 25 may determine the period in which the path 1 with the highest transition probability is in the ON state for the entire period, and calculate the period "4" as the seriousness.

In the example described above, the seriousness calculating unit 25 searches for a path by round-robin, but other methods may be used for searching for a path. The seriousness calculating unit 25 may set the length of time in the ON state as the seriousness, instead of the number of samples in the ON state in the entire period of the path with the highest transition probability or in the period with interference. For example, in the above example, when the time length of one sample is 1 second, the seriousness becomes 2.

As another example, the seriousness calculating unit 25 may determine the number of unique signals in the period determined to have interference (1 in the paths 1 to 3 and 0 in the path 4) by considering the ON state consecutively having one or a plurality of samples in each path as a unique signal, and may calculate the number of unique signals in the period determined to have interference in the path with the highest transition probability as the seriousness. Alternatively, the seriousness calculating unit 25 may determine the number of unique signals of the path with the highest transition probability in the entire period of the path including the period before and after the period determined to have interference, instead of the period determined to have the interference. For example, as described above, it is assumed that interference is detected in the time zones of the 50th sample and the 51st sample of the state time-series data of the detection target signal, and the signal states of the 49th sample and the 52nd sample are in the ON state (S1). When the transition probability P related to the calculation is set as in (7) to (11), the path 1 of (12) is determined to have the highest transition probability in the path including before and after the period determined to have interference. For this reason, the seriousness calculating unit 25 determines that the number of unique signals in the path 1 is "1", and thereby calculates the seriousness as "1".

The seriousness presenting unit 26 presents the seriousness of the interference in each sample calculated as in the calculation examples 1 to 5, or the seriousness of the detection target signal in consideration of all the interferences, to the user. The seriousness presenting unit 26 may present the period in which the interference detected by the interference detection unit 24 exists in association with the seriousness. When it is determined that interference exists over a plurality of samples as in the calculation examples 2, 3, and 5, the seriousness presenting unit 26 may present the length of the period in which interference exists (e.g., sample length) together with the seriousness. Further, the seriousness presenting unit 26 may present the seriousness of each sample when it is determined that interference exists over a plurality of samples.

As described above, the seriousness calculating unit 25 can calculate the seriousness of interference for each of the plurality of samples, based on the state transition path of the signal state in the plurality of samples (time slots) in the learned signal state model. As a result, the user can discriminate and deal with the interference to be prioritized from among the interference generated in a plurality of samples, and therefore, can efficiently deal with the interference.

Herein, the seriousness calculating unit 25 can also calculate the seriousness of the interference in the detection target signal, based on the severity of each of the plurality of samples calculated. Therefore, the user can determine whether or not to preferentially deal with the interference generated in the entire plurality of samples. For example, when the seriousness is high, the user may determine that it is necessary to deal with the interference preferentially, whereas when the seriousness is low, the user may determine that there is less need to deal with the interference.

In the signal state model, the signal state can be either an ON state or an OFF state (i.e., the number of transition states of the signal state is 2). Thus, the interference detection system 20 can calculate the seriousness of the interference for a normal digital signal.

Herein, the signal state model learning unit 22 can set a sample (time slot) length in which the ON state continues as a parameter of the state transition probability of the signal state model. The seriousness calculating unit 25 calculates the seriousness of the interference in the detection target signal by using the parameter and the number of samples in which the ON state continues immediately before the sample in which the interference detection unit 24 detects the interference in the detection target signal. As a result, the interference detection system 20 can present a seriousness with higher accuracy.

The seriousness calculating unit 25 specifies a state transition path with the largest transition probability among the plurality of state transition paths of the signal state in the period by using the signal state of the detection target signal immediately before and immediately after the period in which the interference detection unit 24 detects the interference and the learned signal state model. Then, at least one of the length of time in which the signal is turned on, the number of time slots in which the signal is turned on, the number of times in which the signal is turned on continuously, or an expected value of any of these can be calculated as the seriousness of the interference in at least one of the entire period of the specified state transition path and the period in which the interference is detected. Thereby, the interference detection system 20 can present the seriousness, which is an appropriate indicator according to the nature of the signal. Note that there may be a plurality of state transition paths with the maximum transition probability.

The learning signal and the detection target signal may be radio signals in the same or adjacent frequency bands. As a result, the interference detection system 20 can detect the seriousness of the interference of the radio signal in a certain frequency band without grasping the content of the signal in advance.

Note that the present disclosure is not limited to the above-mentioned example embodiments, and can be modified as appropriate within a range not deviating from the gist. For example, in the calculation examples 1 to 5 in the second example embodiment, the state transition probability is calculated on the assumption that the state transition occurs in the ascending order (time-series order) of the samples by the seriousness presenting unit 26, but the state transition probability may be calculated on the assumption that the state transition occurs in the descending order (reverse time-series order) of the samples. For example, in the calculation example 1, when the state of the 51st sample of the state time-series data of the detection target signal is the ON state (S1), the seriousness calculating unit 25 refers to the learned signal state model and specifies the probability that S1 continues up to the 50th sample. Then, the seriousness calculating unit 25 calculates the probability as the seriousness of the interference of the 50th sample.

In the calculation example 5, the seriousness calculating unit 25 may calculate, as the seriousness, the expected value of the number of samples that are in the ON state in the period determined to have interference (specifically, in the time zones of the 50th sample and the 51st sample), by using the calculated transition probabilities in the paths. For example, in the calculation example 5 above, the expected value of the number of samples is $$(2*0.567+1*0.0+1*0.0+0*0.01) \approx 1.134 \qquad (16).$$

Thus, the seriousness is 1.134.

Alternatively, in the calculation example 5, the seriousness calculating unit 25 may calculate, as the seriousness, the expected value of the number of samples that have been in the ON state in not only the period determined to have interference but also the entire period on the path including the preceding and subsequent periods (specifically, the time zone of the 49th to 52nd samples), by using the calculated transition probabilities in the paths. For example, in the calculation example 5 above, the expected value of the number of samples is $$(4*0.567+3*0.0+3*0.0+2*0.01) \approx 2.27 \qquad (17).$$

Thus, the seriousness is 2.27. As described above, the seriousness calculating unit 25 may use the period for which the expected value of the number of samples is calculated as the period determined to have interference, or as the entire period on the path including the period determined to have interference and the preceding and subsequent periods.

Further, the first and second embodiments can be combined as desirable by one of ordinary skill in the art.

Figure 7:
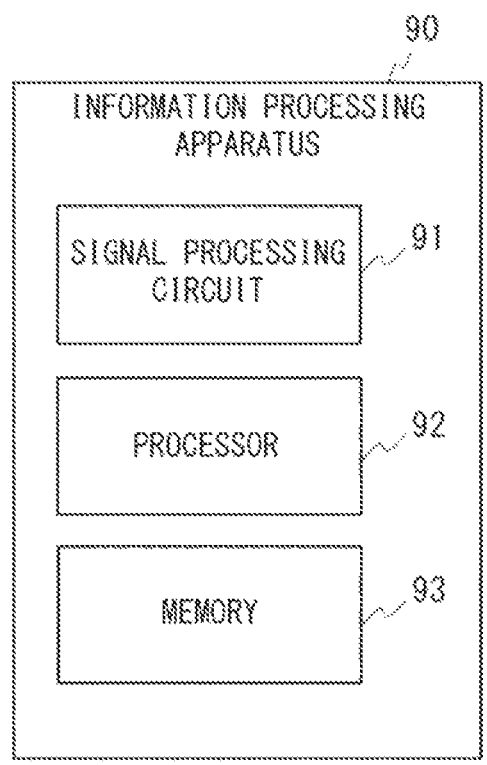
FIG. 7 is a block diagram illustrating an example of a hardware configuration of an apparatus according to each example embodiment.

FIG. 7 is a block diagram illustrating an example of a hardware configuration of an information processing apparatus (signal processing apparatus) in which the processing of each example embodiment described above is executed. Referring to FIG. 7, the information processing apparatus 90 includes a signal processing circuit 91, a processor 92, and a memory 93.

The signal processing circuit 91 is a circuit for processing a signal in accordance with the control of the processor 92. Note that the signal processing circuit 91 may include a communication circuit that receives a signal from a transmission apparatus.

The processor 92 reads software (a computer program) from the memory 93 and executes the software, thereby performing the processing of the apparatus described in the above example embodiment. As an example of the processor 92, one of a Central Processing Unit (CPU), a Micro Processing Unit (MPU), a Field-Programmable Gate Array (FPGA), a Demand-Side Platform (DSP), and an Application Specific Integrated Circuit (ASIC) may be used, or a plurality of them may be used in parallel.

The memory 93 is composed of a volatile memory, a nonvolatile memory, or a combination thereof. The number of memories 93 is not limited to one, and a plurality of memories 93 may be provided. The volatile memory may be, for example, a Random Access Memory (RAM) such as a Dynamic Random Access Memory (DRAM) or a Static Random Access Memory (SRAM). The nonvolatile memory may be, for example, a Random Only Memory (ROM), such as a Programmable Random Only Memory (PROM), an Erasable Programmable Read Only Memory (EPROM), a flash memory, or a Solid State Drive (SSD). The memory 93 is used to store one or more instructions. Herein, one or more instructions are stored in the memory 93 as a group of software modules. The processor 92 reads these software modules from the memory 93 and executes them, thereby performing the processing described in the above example embodiment.

Note that the memory 93 may include one built in the processor 92 in addition to one provided outside the processor 92. The memory 93 may also include a storage remotely located from the processor that constitutes the processor 92. In this case, the processor 92 can access the memory 93 via an input/output (I/O) interface.

One or a plurality of processors included in the interference detection apparatus 10 or the interference detection system 20 execute one or a plurality of programs including instructions for causing a computer to perform the algorithm described with reference to the drawings, as described above. By this processing, the signal processing method described in each example embodiment can be achieved.

The program(s) include instructions (or software code) that, when being read into a computer, cause the computer to perform one or more of the functions described in the example embodiments. The program may be stored on a non-transitory computer-readable medium or tangible storage medium. By way of example, and not limitation, computer-readable or tangible storage media include random-access memory (RAM), read-only memory (ROM), flash memory, solid-state drive (SSD) or other memory technology, CD-ROM, digital versatile disk (DVD), Blu-ray (registered trademark) disk or other optical disk storage, magnetic cassettes, magnetic tape, magnetic disk storage, or other magnetic storage devices. The program may be transmitted over a temporary computer-readable medium or communication medium. By way of example, and not limitation, temporary computer-readable or communication media may include electrical, optical, acoustic, or other forms of propagated signals.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

According to the present disclosure, it is possible to provide an interference detection apparatus, an interference detection method, and a program that enable a user to determine the priority of interference to be dealt with in communication.

What is claimed is:

1. An interference detection apparatus comprising:
at least one memory storing instructions; and
at least one processor coupled to the memory and configured to execute the instructions to:
learn a signal state model by applying a learning signal in a communication signal,
acquire a detection target signal in the communication signal,
detect interference in the detection target signal, and
calculate a severity of interference in the detection target signal by applying the detection target signal, a detection result of the interference, and the learned signal state model.

2. The interference detection apparatus according to claim 1, wherein the at least one processor is further configured to execute the instructions to calculate the severity of interference for each of a plurality of consecutive time slots of the detection target signal, based on a state transition path of a signal state in the plurality of consecutive time slots in the learned signal state model when detecting interference in the plurality of consecutive time slots.

3. The interference detection apparatus according to claim 2, wherein the at least one processor is further configured to execute the instructions to calculate the severity of interference in the detection target signal, based on the severity of each of the plurality of consecutive time slots being calculated.

4. The interference detection apparatus according to claim 1, wherein in the signal state model, a signal state of the communication signal is either an ON state or an OFF state.

5. The interference detection apparatus according to claim 4, wherein the at least one processor is further configured to execute the instructions to set a time slot length in which the ON state continues as a parameter of a state transition probability of the signal state model, and calculate the severity of interference in the detection target signal by applying the parameter and the time slot length in which the ON state continues immediately before a time slot in which interference is detected, in the detection target signal.

6. The interference detection apparatus according to claim 4, wherein the at least one processor is further configured to execute the instructions to identify, by applying the learned signal state model and the signal state of the detection target signal immediately before and immediately after a period in which interference is detected, a state transition path with a maximum transition probability among a plurality of state transition paths of the signal state in the period, and calculate at least one of a length of time in which the signal state is in the ON state, a number of time slots in which the signal state is in the ON state, or a number of times in which the signal state is in the ON state continuously, as the severity of interference, in at least one of an entire period of the identified state transition path or the period in which interference is detected.

7. The interference detection apparatus according to claim 1, wherein the learning signal and the detection target signal are radio signals in a same frequency band or adjacent frequency bands.

8. An interference detection method performed by a processor comprising:
learning a signal state model by applying a learning signal in a communication signal;
acquiring a detection target signal in the communication signal;
detecting interference in the detection target signal; and
calculating a severity of interference in the detection target signal by applying the detection target signal, a detection result of the interference, and the learned signal state model.

9. The interference detection method according to claim 8, further comprising calculating the severity of interference for each of a plurality of consecutive time slots of the detection target signal, based on a state transition path of a signal state in the plurality of consecutive time slots in the learned signal state model when detecting interference in the plurality of consecutive time slots.

10. The interference detection method according to claim 9, further comprising calculating the severity of interference in the detection target signal, based on the severity of each of the plurality of consecutive time slots being calculated.

11. The interference detection method according to claim 8, wherein in the signal state model, a signal state of the communication signal is either an ON state or an OFF state.

12. The interference detection method according to claim 11, further comprising: setting a time slot length in which the ON state continues as a parameter of a state transition probability of the signal state model; and calculating the severity of interference in the detection target signal by applying the parameter and the time slot length in which the ON state continues immediately before a time slot in which interference is detected, in the detection target signal.

13. The interference detection method according to claim 11, further comprising: identifying, by applying the learned signal state model and the signal state of the detection target signal immediately before and immediately after a period in which interference is detected, a state transition path with a maximum transition probability among a plurality of state transition paths of the signal state in the period, and calculating at least one of a length of time in which the signal state is in the ON state, a number of time slots in which the signal state is in the ON state, or a number of times in which the signal state is in the ON state continuously, as the severity of interference, in at least one of an entire period of the identified state transition path or the period in which interference is detected.

14. The interference detection method according to claim 8, wherein the learning signal and the detection target signal are radio signals in a same frequency band or adjacent frequency bands.

15. A non-transitory computer-readable medium storing executable instructions that, when executed by a processor, cause the processor to:
learn a signal state model by applying a learning signal in a communication signal;
acquire a detection target signal in the communication signal;
detect interference in the detection target signal; and
calculate a severity of interference in the detection target signal by applying the detection target signal, a detection result of the interference, and the learned signal state model.

* * * * *